(12) United States Patent
Gagas et al.

(10) Patent No.: US 11,420,523 B2
(45) Date of Patent: Aug. 23, 2022

(54) ENHANCED ELECTRIC DRIVE VEHICLE OPERATION VIA PULSE WIDTH MODULATION (PWM) TYPE AND FREQUENCY CONTROL

(71) Applicant: GM GLOBAL TECHNOLOGY OPERATIONS LLC, Detroit, MI (US)

(72) Inventors: Brent S. Gagas, Ferndale, MI (US); Brian A. Welchko, Oakland, MI (US); Kerrie M. Spaven, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 174 days.

(21) Appl. No.: 17/032,449

(22) Filed: Sep. 25, 2020

(65) Prior Publication Data

US 2022/0097530 A1 Mar. 31, 2022

(51) Int. Cl.
*B60K 1/04* (2019.01)
*B60L 15/20* (2006.01)
*B60L 50/60* (2019.01)
*B60L 53/20* (2019.01)
*H02P 29/68* (2016.01)
*H02P 27/08* (2006.01)

(52) U.S. Cl.
CPC ............. *B60L 15/20* (2013.01); *B60K 1/04* (2013.01); *B60L 50/66* (2019.02); *B60L 53/20* (2019.02); *H02P 27/085* (2013.01); *H02P 29/68* (2016.02); *B60L 2210/40* (2013.01); *B60L 2240/421* (2013.01); *B60L 2240/423* (2013.01); *B60L 2240/525* (2013.01)

(58) Field of Classification Search
CPC .......... B60L 15/20; B60L 53/20; B60L 50/66; H02P 29/68; H02P 27/085; B60K 1/04
See application file for complete search history.

(56) References Cited

U.S. PATENT DOCUMENTS 6,275,004 B1 8/2001 Tamai et al.
6,752,131 B2 6/2004 Poola et al.
(Continued)

FOREIGN PATENT DOCUMENTS

WO 2016198763 A1 12/2016

*Primary Examiner* — Jonathan Ng
*Assistant Examiner* — James J Triggs
(74) *Attorney, Agent, or Firm* — Quinn IP Law (57) ABSTRACT

Presented are high-voltage electrical systems with optimized pulse width modulation (PWM) control, methods for making/using such systems, and vehicles with enhanced electric drive capabilities via PWM type and frequency control. A method of operating an electrical system includes an electronic controller determining a PWM region layout with multiple PWM regions arranged in a torque-speed curve calibrated to an electric motor and power inverter. The controller selects one of the PWM regions based on a speed and torque of the motor, and selects a PWM type based on this selected PWM region. The controller selects a PWM switching frequency style based on the selected PWM region, and selects a PWM switching frequency based on the selected PWM region, switching frequency style, and PWM type. The controller commands a power inverter to regulate transfer of electrical power between a rechargeable battery and the motor based on the PWM type and switching frequency.

20 Claims, 6 Drawing Sheets

(56) References Cited

U.S. PATENT DOCUMENTS

| | | | |
|---|---|---|---|
| 6,994,072 B2 | 2/2006 | Kuo et al. | |
| 7,057,371 B2* | 6/2006 | Welchko | H02P 27/08 |
| | | | 318/400.27 |
| 7,128,047 B2 | 10/2006 | Kuo et al. | |
| 7,196,493 B2* | 3/2007 | McGee | H02J 7/00302 |
| | | | 320/132 |
| 7,367,313 B2 | 5/2008 | Chang et al. | |
| 7,463,970 B2 | 12/2008 | Livshiz et al. | |
| 7,689,343 B2 | 3/2010 | Dagci et al. | |
| 7,690,456 B2* | 4/2010 | Deng | B60L 50/61 |
| | | | 180/65.265 |
| 7,725,244 B2 | 5/2010 | Itoga et al. | |
| 8,000,882 B2 | 8/2011 | Ramappan et al. | |
| 8,210,158 B2 | 7/2012 | Kang et al. | |
| 8,316,818 B2 | 11/2012 | Ramappan et al. | |
| 8,347,860 B2 | 1/2013 | Kang et al. | |
| 8,565,949 B2 | 10/2013 | Christman et al. | |
| 8,776,737 B2 | 7/2014 | Bayer et al. | |
| 8,903,622 B2* | 12/2014 | Tseng | B60L 50/15 |
| | | | 701/100 |
| 9,074,551 B2 | 7/2015 | Yun et al. | |
| 9,142,980 B2 | 9/2015 | Lee | |
| 9,334,815 B2 | 5/2016 | Cygan, Jr. et al. | |
| 9,350,189 B2* | 5/2016 | Kim | H02J 7/007 |
| 9,481,254 B1* | 11/2016 | Schulz | B60L 15/2045 |
| 9,551,248 B2 | 1/2017 | Warey et al. | |
| 9,660,462 B2 | 5/2017 | Jeon | |
| 9,689,321 B2 | 6/2017 | Kang et al. | |
| 9,689,339 B2 | 6/2017 | Kang et al. | |
| 9,796,376 B2* | 10/2017 | Inoue | B60W 30/18054 |
| 9,975,541 B2* | 5/2018 | Suzuki | B60W 20/40 |
| 10,355,631 B1 | 7/2019 | Secrest et al. | |
| 10,396,696 B1 | 8/2019 | Gagas et al. | |
| 10,541,614 B1 | 1/2020 | Gagas et al. | |
| 10,840,735 B1* | 11/2020 | Cooper | H02J 13/00004 |
| 10,879,727 B1* | 12/2020 | Cooper | H02J 9/062 |
| 2005/0109550 A1* | 5/2005 | Buglione | B60K 6/48 |
| | | | 180/65.25 |
| 2008/0186004 A1* | 8/2008 | Williams | H01L 29/8128 |
| | | | 327/431 |
| 2008/0284385 A1 | 11/2008 | Namuduri et al. | |
| 2011/0215767 A1 | 9/2011 | Johnson et al. | |
| 2011/0247587 A1 | 10/2011 | Chen | |
| 2011/0248675 A1 | 10/2011 | Shiu et al. | |
| 2012/0044014 A1* | 2/2012 | Stratakos | H02J 1/102 |
| | | | 327/530 |
| 2012/0181854 A1 | 7/2012 | Gopalakrishnan et al. | |
| 2012/0206296 A1 | 8/2012 | Wan | |
| 2013/0080023 A1 | 3/2013 | Livshiz et al. | |
| 2013/0080026 A1 | 3/2013 | Kang et al. | |
| 2013/0119935 A1 | 5/2013 | Sufrin-Disler et al. | |
| 2013/0127399 A1 | 5/2013 | Tang et al. | |
| 2014/0152232 A1 | 6/2014 | Johnson et al. | |
| 2016/0258410 A1 | 9/2016 | Cygan, Jr. et al. | |
| 2016/0362020 A1 | 12/2016 | Shepley et al. | |
| 2022/0097530 A1* | 3/2022 | Gagas | B60K 1/04 |

\* cited by examiner

ENHANCED ELECTRIC DRIVE VEHICLE OPERATION VIA PULSE WIDTH MODULATION (PWM) TYPE AND FREQUENCY CONTROL

INTRODUCTION

The present disclosure relates generally to hybrid-electric and full-electric motor vehicles. More specifically, aspects of this disclosure relate to systems, methods, and devices for optimizing electric drive operations for battery electric vehicles (BEVs).

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric ("electric-drive") vehicles, on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Many commercially available hybrid electric and full electric vehicles employ a rechargeable traction battery pack to store and supply the requisite power for operating the powertrain's traction motor(s). In order to generate tractive power with sufficient vehicle range and speed, a traction battery pack is significantly larger, more powerful, and higher in capacity (Amp-hr) than a standard 12-volt starting, lighting, and ignition (SLI) battery. Compared to the single cell of an SLI battery, contemporary traction battery packs group stacks of lithium-ion, lead-acid, or nickel-based battery cells into individual battery modules that are mounted onto the vehicle chassis, e.g., via a battery housing or support tray. Stacked electrochemical battery cells may be connected in series and/or parallel through use of an electrical interconnect board (ICB). The electrical tabs of the individual battery cells, which project out from the module housing, are bent against and subsequently welded to shared busbar plates for inter-module connectivity. A dedicated Battery Pack Control Module (BPCM), through collaborative operation with the vehicle's Powertrain Control Module (PCM), regulates the opening and closing of battery pack contactors to regulate operation of the battery pack for powering the vehicle's traction motor(s).

A high-voltage (HV) electrical system helps to govern the transfer of electricity between an electric-drive vehicle's traction motor(s) and onboard traction battery pack. HV electric systems often employ a front-end, DC-to-DC electric power converter that is electrically connected to the vehicle's traction battery pack in order to increase the supply of voltage to a high-voltage, main direct current (DC) bus and an electronic power inverter module (PIM). A high-frequency bulk capacitor may be arranged across the positive and negative rails of the main DC bus to provide electrical stability and store supplemental electrical energy. Operation and control of each traction motor, which may be in the nature of a polyphase alternating current (AC) motor generator unit (MGU), may be accomplished by employing the PIM to transform battery-generated DC power to motor-driving AC power using pulse-width modulated control signals output from the PCM. Motor windings of each polyphase AC MGU may be coupled to inverter sub-modules of the PIM, each of which employs a pair of switches that open/close in a complementary manner to perform a fast-switching function to convert DC power to AC power, and vice versa.

SUMMARY

Presented herein are high-voltage electrical systems with attendant control logic for optimized pulse width modulation (PWM) control, methods for making and methods for operating such systems, and electric-drive vehicles with enhanced electric drive capabilities via PWM-type and PWM-frequency control. By way of example, disclosed systems and methods improve control and calibration flexibility to correlate PWM type and PWM switching frequency as a function of select motor and power inverter operating parameters. By way of example, a control method defines multiple regions in a torque vs. speed graph that plots motor speed vs. motor torque (or current vs. modulation index), and binding each region to a specific PWM type and PWM switching frequency calibrated to optimize that area for electric vehicle (EV) range, overall vehicle performance, and/or powertrain noise, vibration and harshness (NVH). Enhancement of the control algorithm may be achieved by selecting PWM type and PWM switching frequency as a function of coolant temperature to further minimize NVH impact and help manage thermal limits. In addition to increasing vehicle range and performance while mitigating powertrain NVH, disclosed control features help to mitigate DC bus ripple and achieve higher motor torque with concomitant improvements to vehicle acceleration. Doing so may help to enable performance modes that demand additional flexibility in PWM-type and PWM-frequency calibration to manage inverter thermal characteristics and increase torque capabilities.

Aspects of this disclosure are directed to HV electrical system control logic, closed-loop feedback control techniques, and computer-readable media (CRM) with optimized PWM control by modulating PWM type and frequency, e.g., to optimize EV range, performance, and NVH. In an example, a method is presented for operating an HV electrical system, which may be used in both automotive and non-automotive applications alike. This representative method includes, in any order and in any combination with any of the above and below disclosed options and features: an electronic controller determining a PWM region layout with multiple PWM regions that are arranged along a torque-speed curve calibrated to an electric motor; determining, via the electronic controller from the determined PWM region layout, one of the PWM regions of the torque-speed curve based on a speed and a torque of the electric motor; selecting a PWM type as a function of the determined PWM region; selecting a PWM switching frequency style as a function of the selected PWM region; determining a PWM switching frequency as a function of the selected PWM switching frequency style and the determined PWM type; and transmitting, via the electronic controller to the power inverter, a command signal to regulate a transfer of electrical power between the rechargeable battery and the electric motor based on the selected PWM type and switching frequency.

Additional aspects of this disclosure are directed to HV electrical systems, electrified powertrains, and motor vehicles with flexible PWM type and frequency control. As used herein, the terms "vehicle" and "motor vehicle" may be used interchangeably and synonymously to include any relevant vehicle platform, such as passenger vehicles (HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, electric bicycles (ebike), electric scooters, etc. In an example, an electric-drive vehicle includes a vehicle body with a passenger compartment, multiple road wheels, and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle.

Continuing with the discussion of the above example, the vehicle also includes at least one traction battery pack that is mounted onto the vehicle body and operable to power the vehicle powertrain's traction motor(s). A power inverter module, which electrically connects the traction battery pack(s) to the traction motor(s), receives DC power output by the battery pack or packs, converts the DC power to AC power, and transfers the AC power to the traction motor or motors. An onboard or off-board vehicle controller is programmed to select a PWM region layout with multiple PWM regions that are arranged along a torque-speed curve that is calibrated to the traction motor and power inverter. The vehicle controller then selects one of the PWM regions of the torque-speed curve based on a speed and torque of the traction motor, and selects a PWM type as a function of the selected PWM region. In addition, the controller selects a PWM switching frequency style as a function of the selected PWM region, and selects a PWM switching frequency as a function of the selected PWM type and switching frequency style. The controller then commands the PIM to regulate subsequent transfers of electrical power between the traction battery pack and the traction motor based on the selected PWM type and PWM switching frequency.

For any of the disclosed systems, methods, and vehicles, determining a PWM region may include: calculating respective high-torque and low-torque thresholds for each of the PWM regions at the present speed of the electric motor; determining, for each PWM region, if the torque of the electric motor lies between the corresponding high-torque and low-torque thresholds; and selecting the PWM region with the respective high-torque and low-torque thresholds between which lies the torque of the electric motor. In this instance, the electronic controller may receive a sensor signal from a speed sensor indicative of the present speed of the electric motor.

For any of the disclosed systems, methods, and vehicles, blended torque-speed regions may be calculated for the selected PWM region layout based on an inverter coolant temperature of the power inverter and, optionally, a mechanical power state flag, which may be positive for motoring and negative for regenerative (regen) braking. As yet a further option, determining the PWM region layout may include selecting a PWM region layout from multiple predefined PWM region layouts, including a high-coolant-temp PWM region layout and a low-coolant-temp PWM region layout. In this instance, selecting a PWM type may include linearly interpolating between a first (low) inverter coolant temperature associated with the low-coolant-temp PWM region layout and a second (high) inverter coolant temperature associated with the high-coolant-temp PWM region layout.

For any of the disclosed systems, methods, and vehicles, PWM type may be selected from a predefined list of PWM types, including a discontinuous PWM (DPWM) technique, a zero-vector modulation (ZVM) technique, and a space-vector PWM (SVPWM) technique. In the same vein, PWM switching frequency style may be selected from a predefined list of PWM switching frequencies, including a constant pulse ratio (cPR) switching style, a constant switching frequency (cFsw) switching style, and a lookup table (LUT) with an array of switching frequency styles associated with various inputs, such as motor speed and/or torque. If the PWM switching frequency style is selected from a LUT, the vehicle/system/method may further determine if the selected PWM type is either a DPWM technique or a ZVM technique. If so, a memory-stored DPWM LUT is retrieved, e.g., from cache memory in a resident memory device, and the PWM switching frequency is selected from this DPWM LUT. If the selected PWM type is neither a DPWM technique nor a ZVM technique, a memory-stored SVPWM LUT is retrieved and the PWM switching frequency is selected from this SVPWM LUT.

For any of the disclosed systems, methods, and vehicles, it may be determined if: (1) the selected PWM type is a SVPWM technique, and (2) the PWM switching frequency is greater than a threshold maximum PWM switching frequency for SVPWM. If yes to both, the PWM switching frequency may be set to the threshold maximum PWM switching frequency prior to transmitting the command signal to the power inverter.

For any of the disclosed systems, methods, and vehicles, the electric motor speed may be a real-time motor speed, and the electric motor torque may be a user-requested motor torque output. Furthermore, determining a PWM region layout may include selecting a PWM region layout, based on a coolant temperature, from multiple distinct PWM region layouts that are stored in a memory device. In this instance, the electronic controller may receive a sensor signal from a temperature sensor indicative of a real-time temperature of a coolant fluid flowing in the power inverter.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
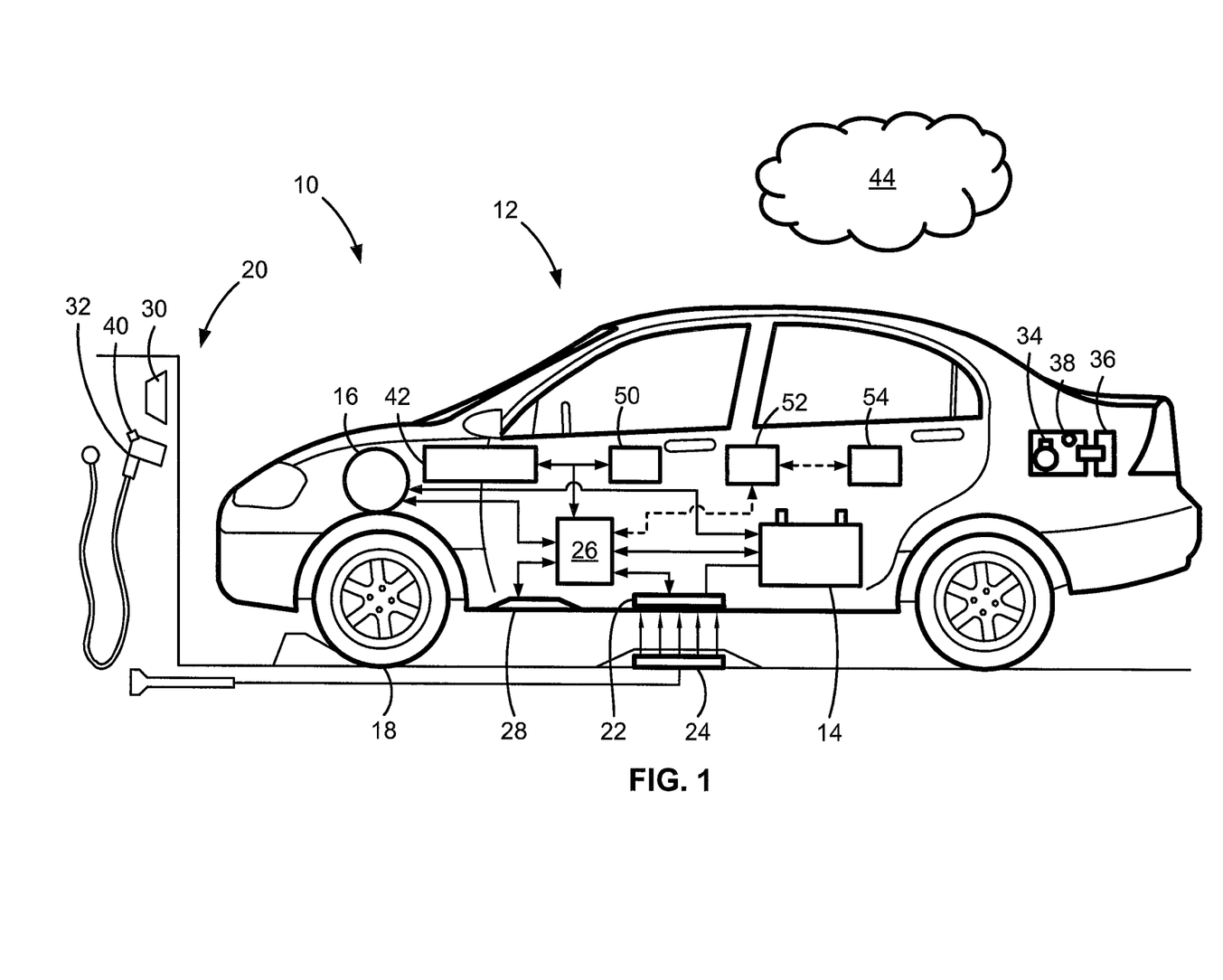
FIG. 1 is a partially schematic, side-view illustration of a representative electric-drive vehicle with enhanced electric drive capabilities utilizing flexible PWM-type and PWM-frequency control according to aspects of the disclosed concepts.

Referring now to the drawings, wherein like reference numbers refer to like features throughout the several views, there is shown in FIG. 1 a representative automobile, which is designated generally at 10 and portrayed herein for purposes of discussion as a sedan-style, plug-in battery electric vehicle (BEV). The illustrated automobile 10—also referred to herein as "motor vehicle" or "vehicle" for short—is merely an exemplary application with which aspects of this disclosure may be practiced. In the same vein, incorporation of the present concepts into an all-electric BEV powertrain should also be appreciated as a non-limiting implementation of disclosed novel features. As such, it will be understood that aspects and features of this disclosure may be applied to other electrified powertrain architectures, implemented for any logically relevant type of vehicle, and utilized for both automotive and non-automotive applications alike. Moreover, only select components of the motor vehicles and HV electrical systems are shown and described in additional detail herein. Nevertheless, the vehicles and systems discussed below may include numerous additional and alternative features, and other available peripheral components, for carrying out the various methods and functions of this disclosure.

FIG. 1 is a simplified illustration of the electric-drive vehicle 10 docked at and operably coupled to a vehicle charging station 20 for recharging an onboard rechargeable energy source, such as a high-voltage, direct current (DC) traction battery pack 14. Traction battery pack 14 may take on many suitable configurations, including an array of stacked lead-acid, lithium-ion, or other applicable type of rechargeable electric battery cell. To provide an operable coupling between the traction battery pack 14 and vehicle charging station 20, the vehicle 10 may include an inductive charging component 22 with an integrated induction coil that is mounted to the underside of the vehicle body 12. This inductive charging component 22 serves as a wireless charging interface that is compatible with a wireless charging pad 24 with an internal EMF coil of the vehicle charging station 20. In the illustrated example, the wireless charging pad 24 is located on the floor of the charging station 20, and is positioned in accordance with a "target position" that may serve as a desired parking location for purposes of efficient and effective wireless charging of the vehicle 10. In particular, FIG. 1 depicts the vehicle 10 parked in proper fore-aft alignment and in proper starboard-port alignment with the charging pad 24—aligned with the target position—to complete an inductive charging event for the battery pack 14 that maximizes the percentage of power transmitted wirelessly between the two devices.

The vehicle charging station 20 may employ any heretofore and hereafter developed type of wired and wireless charging technology, including inductive charging, radio charging, capacitive charging, and resonance charging, as some non-limiting examples. In accordance with electromagnetic induction charging technology, the representative wireless charging pad 24 of FIG. 1 may be activated with electric current to generate an alternating electromagnetic field proximate the inductive charging component 22. This time-variant magnetic field, in turn, induces an electric current in the inductive charging component 22 of the vehicle 10. The induced current may be filtered, stepped-down, and/or phase-shifted by in-vehicle electrical modulation circuitry (e.g. a traction power inverter module (TPIM) 26) to charge the traction battery pack 14 or any other energy source of the vehicle 10 (e.g., a standard 12V lead-acid starting, lighting, and ignition (SLI) battery, an auxiliary power module, etc.).

Traction battery pack 14 stores energy that can be used for propulsion by one or more electric traction motors 16 and for operating other vehicle electrical systems. The traction battery pack 14 is communicatively connected (wired or wirelessly) to one or more vehicle controllers, represented in FIG. 1 by electronic control unit (ECU) 42, that regulate the operation of various onboard vehicle systems and components. Contactors controlled by the ECU 42, for example, may isolate the traction battery pack 14 from select components when opened, and connect the traction battery pack 14 to select components when closed. The ECU 42 is also communicatively connected to the electric traction motor(s) 16 to control, for example, bi-directional transfer of energy between the traction battery pack 14 and each motor 16. For instance, traction battery pack 14 may provide a DC voltage while the motor(s) 16 may operate using a three-phase AC current; in such an instance, a TPIM 26 governed by ECU 42 converts the DC voltage to a three-phase AC current for use by the motors 16. In a regenerative mode, e.g., in which the traction motor 16 is configured as motor-generator unit (MGU), the ECU-controlled TPIM 26 converts AC power from the motor-generator(s) 16 to DC power compatible with the traction battery pack 14. The representative ECU 42 is also shown communicating with charging component 22, for example, to condition the power supplied from the vehicle charging station 20 to the battery pack 14 to help ensure proper voltage and current levels.

Vehicle charging station 20 of FIG. 1 also offers wired charging for electric vehicle 10 via a "plug-in" electrical connector 32, which may be one of a number of different commercially available electrical connector types. By way of non-limiting example, electrical connector 32 may be a Society of Automotive Engineers (SAE) J1772 (Type 1) or J1772-2009 (Type 2) or International Electrotechnical Commission (IEC) 62196-2 and/or 62196-3 Fdis compatible electrical connector with single-phase or split-phase modes operating at 120 to 240 volts (V) with alternating current (AC) at up to 80 amperes (A) peak current for conductive charging. A charge port 34 accessible on the exterior of vehicle body 12 is a wired charging interface functioning as an electrical inlet into which electrical connector 32 may be plugged or otherwise mated. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the vehicle 10 and station 20 may individually or collaboratively monitor wired/wireless charging availability, wireless power quality, proper vehicle alignment, charge component compatibility, and other related issues that may affect vehicle charging. According to the illustrated example, the vehicle ECU 42 of FIG. 1 communicates with and receives sensor signals from a monitoring system, which may comprise one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that shown in the drawings. A CPD sensor 38 mounted by the charge port 34 may sense, and be polled or read by the vehicle's ECU 42 to determine, a door status—opened or closed—of the CPD 36. As another option, a latching button 40 that helps to physically attach and secure the electrical connector 32 to the charge port 34 may include an internal switch (e.g., an SAE S3 type switch) that functions as a sensing device to detect whether or not the electrical connector 32 is operatively connected to the charge port 34.

Propulsion of the electric-drive vehicle 10 of FIG. 1 is provided by an electrified powertrain system, which is represented herein by a traction motor 16 that is powered by battery pack 14 through cooperative operation of the ECU 42 and TPIM 26 to drive one or more of the vehicle's road wheels 18. Traction motor 16 may be a brushless permanent magnet (PM), multiphase AC MGU that receives modulated DC electrical power generated by lithium-polymer battery modules inside the chassis-mounted traction battery pack 14. To optimize EV range, overall vehicle performance, and powertrain NVH, the ECU 42 and TPIM 26 provision control and calibration flexibility to correlate PWM type and PWM switching frequency as a function of select motor and power inverter operating parameters. Enhanced control for PWM type and PWM switching frequency may be a function of real-time inverter coolant temperature, real-time motor speed, and user/vehicle-requested motor output torque, for example.

Increased calibration flexibility may be achieved, at least in part, by defining discrete PWM regions throughout the motor's torque-speed curve that balance vehicle range and performance with powertrain NHV and time-varying phenomena of the electrical system. Regions may optionally appear or disappear in low and/or high coolant temperature torque-speed curves due to innate flexibility of how each region is individually defined (e.g., delineated by a respective motor speed range and respective high and low torque thresholds). Furthermore, switching frequency may be "clamped" within a predefined useable range for specific PWM types, for example, to protect the powertrain and electrical system's hardware. These "calibratable" PWM regions help provision opportunities to operate the HV electrical system in the most favorable PWM type and PWM switching frequency across the full range of motor torque vs. speed. Flexible hysteresis "dead-band" sections may be defined between the PWM regions to "smooth" region-to-region transitions without toggling PWM type and switching frequency.

Figure 2:
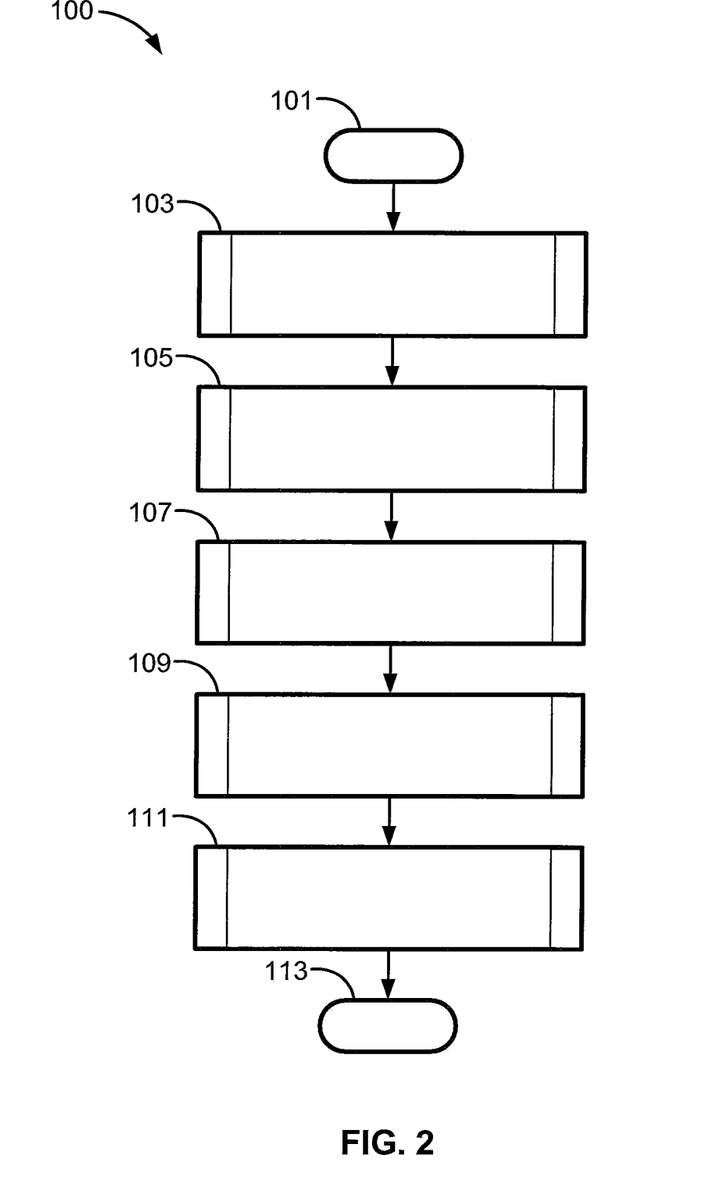
FIG. 2 is a simplified flowchart illustrating a representative PWM control protocol, which may correspond to memory-stored instructions executed by an onboard or remote controller, control-logic circuit, programmable control unit, or other integrated circuit (IC) device or network of devices in accord with aspects of the disclosed concepts.
Figure 3A:
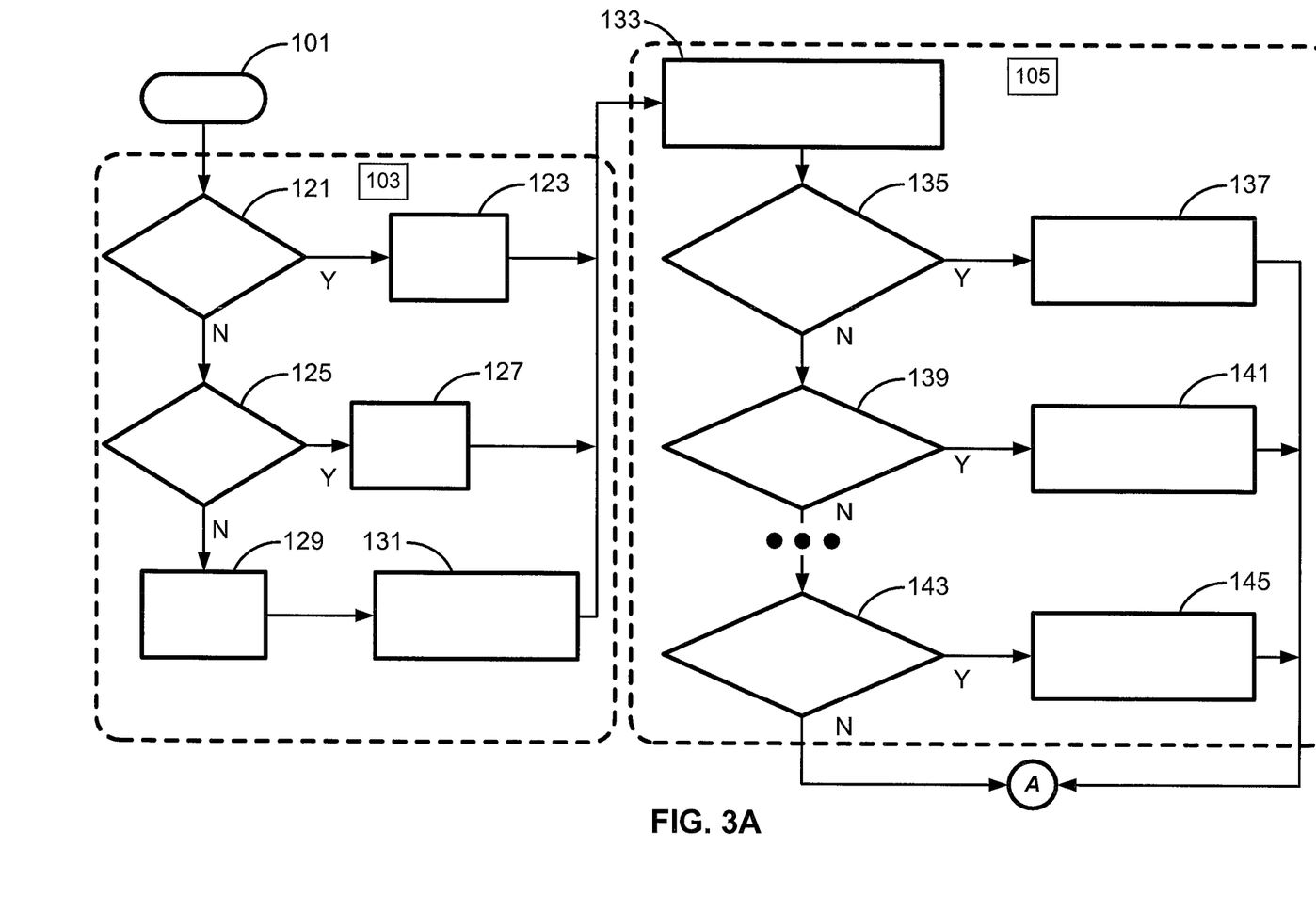
FIGS. 3A and 3B are a more comprehensive flowchart detailing the control operations of the representative PWM control protocol of FIG. 2.
Figure 3B:
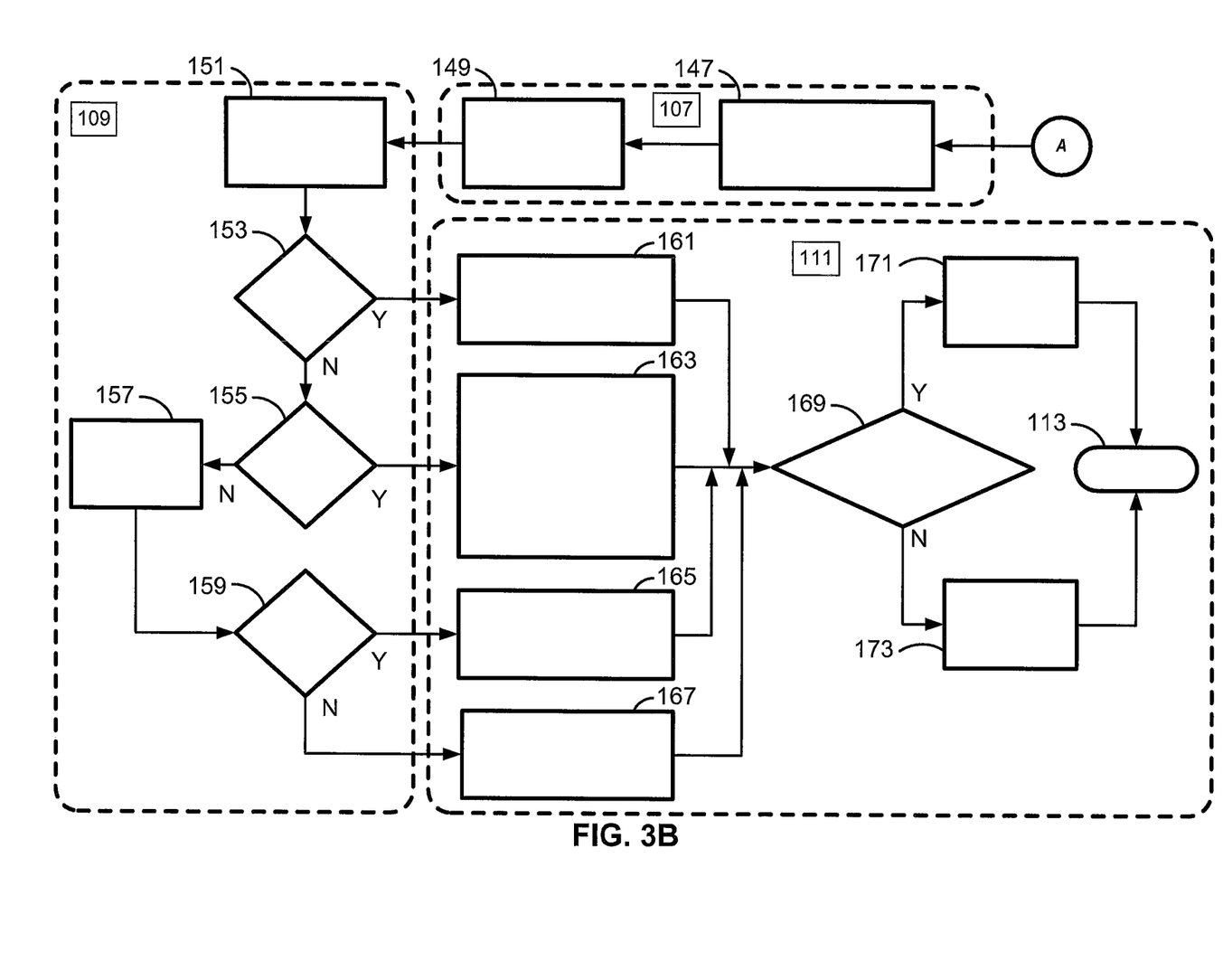

With reference next to the flow charts of FIGS. 2, 3A and 3B, an improved method or control strategy for operating a high-voltage electrical system, such as the electrified powertrain of motor vehicle 10 of FIG. 1, is generally described at 100 in accordance with aspects of the present disclosure. Some or all of the operations illustrated in FIGS. 2, 3A and 3B, and described in further detail below, may be representative of an algorithm that corresponds to processor-executable instructions that may be stored, for example, in main or auxiliary or remote memory (e.g., resident memory device 50 of FIG. 1), and executed, for example, by an electronic controller, processing unit, control logic circuit, or other module or device or network of modules/devices (e.g., TPIM 26 and ECU 42), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 100 of FIG. 2 begins at terminal block 101 with memory-stored, processor-executable instructions for a programmable controller or control module or similarly suitable processor to call up an initialization procedure for a PWM control protocol for a power inverter module, such as TPIM 26 of FIG. 1. This routine may be executed in real-time, continuously, systematically, sporadically and/or at regular intervals, for example, each 10 milliseconds during normal and ongoing operation of the motor vehicle 10. As yet another option, terminal block 101 may initialize responsive to a user command prompt or a broadcast prompt signal received from an "off-board" centralized host system (e.g., cloud computing service 44). Upon completion of the control operations presented in FIG. 2, the method 100 may advance to terminal block 113 and temporarily terminate, or may loop back to terminal block 101 and run in a continuous loop.

Figure 4A:
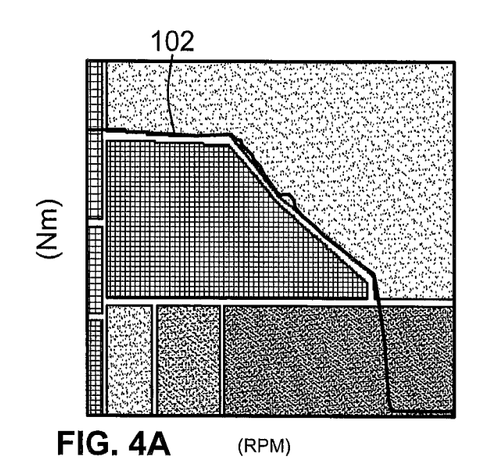
FIGS. 4A to 4C are representative PWM region layouts arranged within a torque-speed curve of motor speed (revolutions per minute (RPM)) vs. motor torque (Newton-meters (Nm)) calibrated for a representative traction motor and power inverter of a battery electric vehicle for determining a coolant-temperature based PWM region layout in accord with aspects of the disclosed concepts.
Figure 4B:
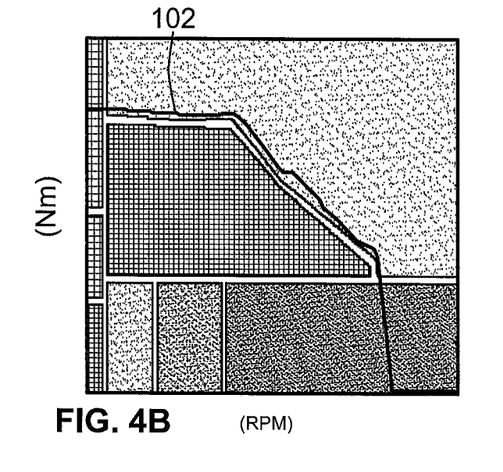
Figure 4C:
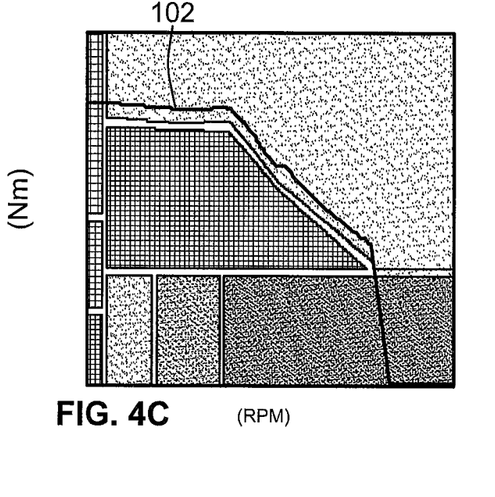

Method 100 advances from terminal block 101 to predefined subroutine block 103 to select, retrieve, calculate, or calibrate (collectively "determine") a pulse width modulation (PWM) region layout for the present operating conditions of the HV electrical system. FIGS. 4A to 4C, for example, illustrate three representative PWM region layouts—a low-temp PWM region definition (FIG. 4A), a blended PWM region definition (FIG. 4B), and a high-temp PWM region definition (FIG. 4C)—for a torque-speed curve 102 of a representative polyphase BEV motor. This torque-speed curve 102, which is identical in all three of the aforementioned Figures, plots motor speed (RPM) on the x-axis versus motor torque (Nm) on the y-axis and may be derived through a direct-connect dyno or a chassis dyno. In general, a torque-speed curve originates at a crossing point on the Y-axis where torque is maximum and speed is zero. This crossing point is the "stall torque" of the electric machine, namely the maximum motor torque available when the motor is running at nominal voltage. The torque-speed curve slopes downward until it intersects the X-axis at a point of zero torque and maximum speed. FIGS. 4A-4C depict the 'motoring' region of operation where both torque and speed are positive; disclosed methods, however, are equally applicable to the remaining 'regen' region (not depicted) along both the negative motoring and negative region. Optionally, the PWM regions may be arranged within a plot of current versus modulation index (MI).

Derivation of PWM region layout may include selecting an available PWM region layout from multiple distinct PWM region layouts that are stored in a resident or remote memory, e.g., called-up from memory device 50 or downloaded from cloud computing service 44. Any such PWM region layout selection may be based on a real-time temperature of coolant fluid flowing through TPIM 26 as measured by a coolant temperature sensor 52. PWM region layouts for coolant temperatures between the low and high coolant temperatures associated with the low-temp and high-temp PWM region layouts of FIGS. 4A and 4C, respectively, may be derived via linear interpolation. These linearly interpolated "blended regions"—an example of which is shown in FIG. 4B—may be calculated in real-time or near-real time, or calculated off-line and selectively retrieved on the fly by a resident controller, such as ECU 42. Recognizably, the illustrated PWM region layouts are purely representative in nature and non-limiting in effect.

Once the PWM region layout is identified, e.g., for a given inverter coolant temperature and a motor-calibrated torque-speed curve, the method 100 proceeds to predefined subroutine block 105 to determine which PWM region within the chosen layout is optimal under the present operating conditions of the electric motor. In accord with the illustrated example, there are seven PWM regions—labelled (1) through (7) in FIG. 5A—arranged within a plot of motor torque versus speed in the selected PWM region layout. One PWM region is selected from the torque-speed curve based on a speed and a torque of the electric motor. The motor speed may be a real-time or estimated motor speed, whereas the motor torque may be a user-requested or vehicle-commanded motor torque. In FIG. 1, the ECU 42 may communicate with a motor speed sensor 54 to receive and process speed sensor data indicative of the present speed of the traction motor 16. Motor torque, on the other hand, may be a driver-requested torque or a vehicle-controller derived torque based on a driver request as input via a suitable user input device, such as a throttle pedal (not shown). It should be appreciated that the number, shape, and relative orientation of the individual regions may be modified from that which are shown in the Figures.

Figure 5A:
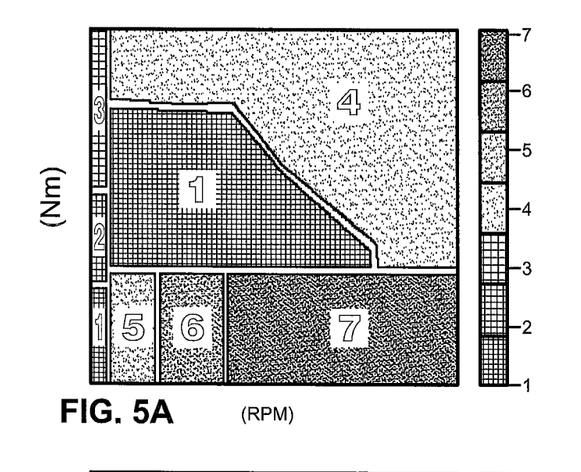
FIGS. 5A to 5D illustrate a selected one of the PWM region layouts within the torque-speed curve from FIGS. 4A-4C for determining a PWM region (FIG. 5A), a PWM type (FIG. 5B), a switching frequency style (FIG. 5C), and a switching frequency (FIG. 5D) in accord with aspects of the disclosed concepts.
Figure 5B:
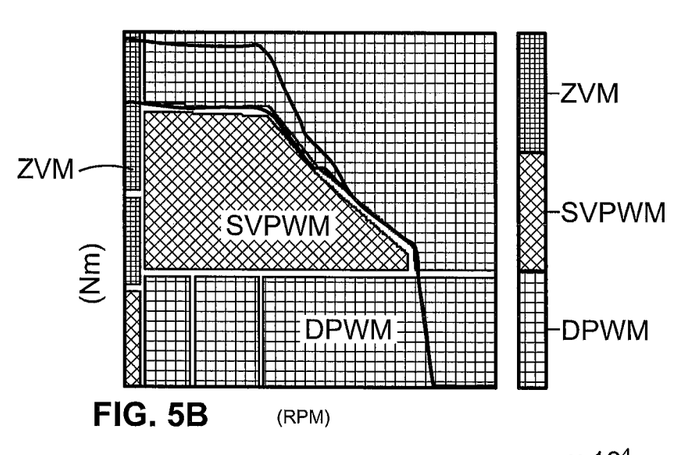

After choosing an optimal PWM region at subroutine block 105, the method 100 continues to predefined subroutine block 107 to select a PWM type as a function of the chosen PWM region. FIG. 5B, for example, illustrates three representative PWM schemes that are available for selection: a discontinuous PWM (DPWM) technique, a zero-vector modulation (ZVM) technique, and continuous PWM (CPWM) technique, such as space-vector PWM (SVPWM). Each of the PWM regions (1) through (7) of FIG. 5A is assigned to one of the available PWM types presented in FIG. 5B. Drawing on an example from the illustrated plots, PWM region six (6) may be selected from the PWM region layout of FIG. 5A for a corresponding motor torque and speed falling within that region; as seen in FIG. 5B, PWM region six (6) is assigned to execute a DPWM technique. While three examples of selectable PWM schemes are illustrated and described, the method 100 may employ greater or fewer than three PWM types, which may include additional or alternative PWM principles.

Figure 5C:
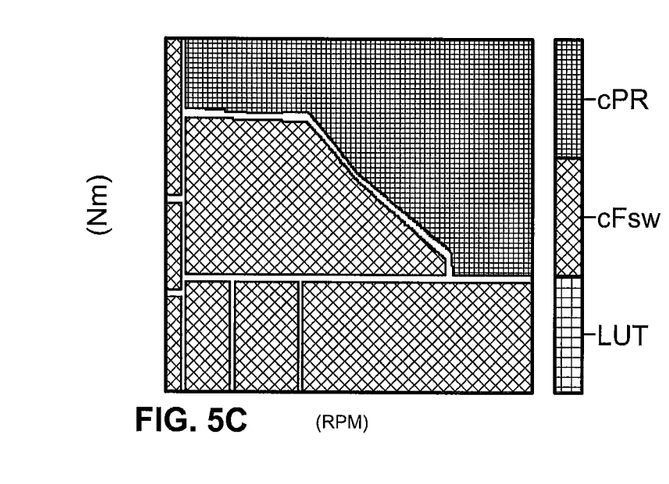

Using the PWM region chosen at subroutine block 105 and the PWM type retrieved at subroutine 107, the method 100 provides processor-executable instructions for an electronic controller to select a PWM switching frequency style at predefined subroutine block 109. For instance, FIG. 5C illustrates three PWM switching frequency styles: a constant pulse ratio (cPR) switching style, a constant switching frequency (cFsw) switching style, and a lookup table (LUT) with an array of selectable switching frequency styles associated with various inputs, such as motor speed and/or torque. Similar to the PWM types of FIG. 5B, each of the PWM regions of FIG. 5A is assigned to one of the available PWM switching frequency styles of FIG. 5C. Continuing with the above example, PWM region six (6) may be selected from the PWM region layout of FIG. 5A; as seen in FIG. 5C, PWM region six (6) is assigned to execute a cFsw switching style. Method 100 of FIG. 2 may employ greater or fewer than three switching styles, which may include additional or alternative available styles.

Method 100 of FIG. 3 transitions from process block 109 to predefined subroutine block 111 to determine a PWM switching frequency as a function of the PWM type chosen at subroutine block 107 and the PWM switching frequency style selected at process block 109. A PWM signal may be typified as a method for generating an analog signal using a digital source, and vice versa. The PWM signal's "switching frequency" determines how fast the PWM completes a cycle (i.e., 500 Hz would be 500 cycles per second), and therefore how fast it switches between high and low states. It may be desirable to combine PWM-type and PWM-switching frequency selection to optimize EV range, performance, and NVH. For an automotive application, such as vehicle 10 of FIG. 1, the selected PWM-type and PWM-switching frequency may be used to govern operation of the TPIM 26 and, in turn, optimize operation of the traction motor 16.

Figure 5D:
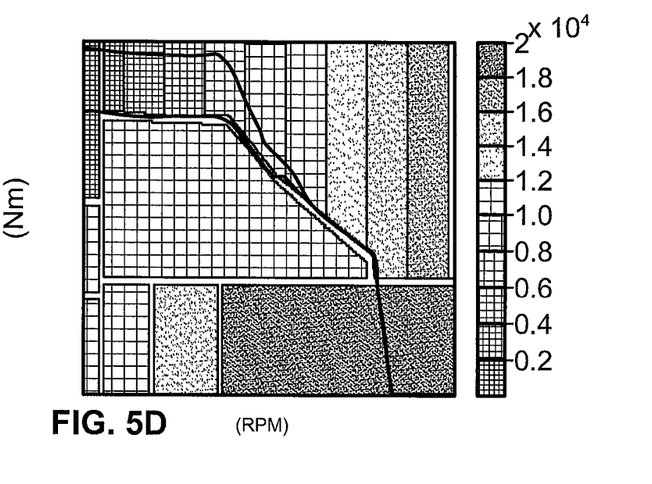

By way of example, and not limitation, a switching frequency ($F_{SW}$) of 2 kilo-Hertz (kHz) may be combined with a ZVM technique for use at low motor speeds and high torque demands, e.g., to enable a rock climbing maneuver for an electrified sport utility vehicle (SUV), ATV, or industrial vehicle and to reduce thermal wear on the inverter and electrical system. Contrastingly, FIG. 5D shows that a switching frequency of 10 kHz may be combined with either a SVPWM or DPWM technique for low motor speeds and low motor torques, e.g., to reduce powertrain NVH. A DPWM technique may be combined with a switching frequency of 10 kHz, 15 kHz, and 20 kHz for use at low torque and low, medium, and high speeds, respectively, to increase EV range. As yet a further option, a switching frequency of 10 kHz may be combined with SVPWM technique for use at midrange torques for NVH reduction. A DPWM technique may be combined with a constant pulse ratio switching style to achieve higher torque/acceleration for both performance and to manage thermal load.

Turning next to FIGS. 3A and 3B, the flowchart presented therein provides more comprehensive and detailed control operations for the individual subroutines of the representative PWM control protocol of FIG. 2. Predefined subroutine block 103 of FIG. 2, for example, begins at decision block 121 of FIG. 3A with determining whether or not the inverter coolant temperature ($T_W$) is less than a first (low) threshold coolant temperature. If it is (block 121=YES), subroutine 103 advances to process block 123 and sets the PWM region layout to the low-coolant-temp PWM region layout (FIG. 4A). If the inverter coolant temperature is greater than the first (low) threshold coolant temperature (block 121=NO), subroutine 103 advances to decision block 125 of FIG. 3A and ascertains whether or not the inverter coolant temperature ($T_W$) is greater than a second (high) threshold coolant temperature. If so (block 125=YES), subroutine 103 advances to process block 127 and sets the PWM region layout to the high-coolant-temp PWM region layout (FIG. 4C).

Responsive to a determination that the coolant temperature ($T_W$) is both greater than the low threshold coolant temperature and less than the high threshold coolant temperature (block 125=NO), subroutine 103 executes the control operations of process block 129 and sets the PWM region layout to a linear blend region layout (FIG. 4B). Subroutine 103 advances from process block 129 to process block 131 and calculates a blended torque-speed region corresponding to the present inverter coolant temperature based on the coolant temperature and a mechanical power state, which may be positive for motoring and negative for regenerative ("regen") braking. The "Regen Flag" illustrated in FIG. 3A may be in the form of a software flag indicating the BEV powertrain is presently operating in a regenerative ("regen") braking mode rather than a motoring mode. In this regard, the PWM region definition plot, PWM type, and PWM switching frequency usage/selection may be different based on whether the vehicle is operating in motoring or regen mode; as a consequence, subroutine 103 may define distinct plots for motoring mode and distinct plots for regen mode.

The PWM region definition plots may be defined through calibration for low and high inverter coolant temperatures. To avoid predefining an exorbitant number of PWM region definition plots for various temperatures between the high and low temperatures, thus reducing any requisite memory storage space for the plots, an "in process" estimation procedure may be carried to linearly interpolate between the high and low region definition plots to estimate a new torque-speed based PWM region plot definition for a present "midrange" coolant temperature. It should be understood that the blended PWM region definition of FIG. 4B is an example at one temperature between the low-temp PWM region definition (FIG. 4A) and the high-temp PWM region definition (FIG. 4C); at a different temperature between the upper and lower temp thresholds, the region definition will vary.

With continuing reference to FIG. 3A, predefined subroutine block 105 of FIG. 2 begins at process block 133 of FIG. 3A and determines a respective first (upper) torque threshold and a respective second (lower) torque threshold for each of the PWM regions at a present motor speed (absolute value) based on the chosen coolant-temp-based PWM region layout and the present operating mode of the system (e.g., motoring vs. regen in an automotive application). For example, the ECU 42 of FIG. 1 will prompt motor speed sensor 54 for sensor data indicative of a real-time motor speed; using this information, the ECU 42 determines a set of torque limits for each region (1) through (7) of FIG. 5A. For region (6) of FIG. 5A, the first (upper) torque threshold is approximately 140 Nm and the second (lower) threshold is approximately zero (0) Nm. By comparison, region (1) has a first (upper) torque threshold of approximately 330-345 Nm and a second (lower) threshold of approximately 150 Nm. Seeing as the graphs presented in FIGS. 5A-5D are provided purely for ease of explanation, other applications may forego use units in Nm, and may define the axis in units or per unit rated torque. Alternative arrangements may use Rated Torque in percentages.

After determining the torque limits for each PWM region, subroutine 105 proceeds to decision block 135 of FIG. 3A and determines whether or not the motor torque ($T_{rq}$) is within the torque limits of the first region: (1) is $T_{rq}$>Region 1 lower torque threshold; and (2) is $T_{rq}$<Region 1 upper torque threshold. If it is (block 135=YES), subroutine 105 advances to process block 137 and sets the PWM region to PWM region (1) (FIG. 5A). Conversely, if the motor torque is outside the torque limits of the first region (block 135=NO), subroutine 105 moves to decision block 139 and determines whether or not the motor torque ($T_{rq}$) is within the torque limits of the second region: (1) is $T_{rq}$>Region 2 lower torque threshold; and (2) is $T_{rq}$<Region 2 upper torque threshold. If so (block 139=YES), subroutine 105 proceeds to process block 141 and sets the PWM region to the PWM region (2) (FIG. 5A). If, however, the motor torque is outside the torque limits of the second region (block 139=NO), the method proceeds to decision block 143 and process block 145 and repeats the inquiries described above for each of the remaining PWM regions until the corresponding region is identified.

Method 100 of FIG. 3A advances from predefined subroutine block 105 to predefined subroutine block 107 of FIG. 3B—as indicated by the circled "A" in each of FIGS. 3A and 3B—and sets a PWM type for the PWM control protocol. As mentioned above, the PWM type is selected as a function of the determined PWM torque-speed region and the present operating mode of the system, as indicated at process block 147. The chosen PWM torque-speed region and type are output at process block 149, for example, to update the PWM switching scheme and for defining the switching frequency style and switching frequency.

After choosing the PWM torque-speed region at subroutine block 105 and the PWM type at subroutine block 107, subroutine 109 begins at process block 151 of FIG. 3B and sets the frequency style as a function of the selected PWM torque-speed region. Subroutine 109 then executes decision block 153 to assess whether or not the PWM switching frequency style corresponding to the selected PWM region and present operating mode of the motor is a constant switching frequency switching style. If it is not (block 153=NO) decision block 155 assess whether or not the PWM switching frequency style corresponding to the selected PWM torque-speed region and present operating mode of the motor is a constant pulse ratio switching style.

Responsive to the PWM switching frequency style being neither a cPR nor a cFsw switching style (block 155=NO), subroutine 109 of FIG. 3B advances to process block 157 and retrieves a lookup table to determine a desired switching frequency. As noted above, PWM regions arranged along the torque-speed curve 102 may be uniquely defined for both motoring operation and regen operation: each region is assigned to use either DPWM, ZVM, or SVPWM); each region is defined for constant switching frequency, constant pulse ratio, or use of a lookup table. For select PWM regions, the protocol will call-up a corresponding lookup table, e.g., from resident memory (memory device 50) or a remote host (cloud computing service 44), such as a first LUT with definitions for DPWM/ZVM and a second LUT with definitions for SVPWM. Based on the present motor speed and motor torque demand, an appropriate switching frequency is selected from the corresponding LUT. Decision block 159 determines if the selected lookup table is for DPWM/ZVM.

Responsive to a determination that the switching frequency style is a cFsw switching style (block 153=YES), the method 100 transitions from subroutine 109 to subroutine 111 and sets the PWM switching frequency based on a constant switching frequency switching style assigned to the corresponding PWM region of operation at process block 161 of FIG. 3B. Responsive to a determination that the switching frequency style is a cPR switching style (block 155=YES), subroutine 111 executes process block 163 and calculates a PWM switching frequency (Fsw) using a constant pulse ratio switching style assigned to the corresponding PWM torque-speed region of operation using the following equation:

$$Fsw=(\text{Motor Speed in RPM}|/60*\text{Pole Pair})*\text{Constant Pulse Ratio}[\text{PWM Torque Speed Region}]$$

Responsive to a determination that the desired switching frequency style is selected using a lookup table (block 157) and the selected lookup table is for DPWM/ZVM (block 159=YES), subroutine 111 executes process block 165 and sets the PWM frequency using the DPWM Fsw LUT. Comparatively, subroutine 111 responds to a determination that the desired switching frequency style is selected using a lookup table (block 157) and the selected lookup table is not for DPWM/ZVM (block 159=NO) by executing process block 167 and sets the PWM frequency using the SVPWM Fsw LUT. At decision block 169, subroutine 111 determines if both: (1) the PWM type is set to SVPWM; and (2) the present PWM switching frequency is greater than a maximum threshold switching frequency for SVPWM. If so (block 169=YES), subroutine 111 clamps PWM switching frequency to the aforesaid maximum threshold switching frequency, as indicated at process block 171. If either of the inquires carried out at decision block 169 comes back false (block 169=NO), subroutine 111 outputs the selected switching frequency and type at process block 173. Method 100 may then terminate at terminal block 113.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a high-voltage (HV) electrical system, the HV electrical system including a rechargeable battery, an electric motor, and a power inverter electrically connecting the rechargeable battery and the electric motor, the method comprising:
determining, via an electronic controller, a pulse width modulation (PWM) region layout with multiple PWM regions arranged in a torque-speed curve calibrated to the electric motor;
determining, via the electronic controller from the determined PWM region layout, one of the PWM regions in the torque-speed curve based on a speed and a torque of the electric motor;
selecting a PWM type as a function of the determined PWM region;
selecting a PWM switching frequency style as a function of the PWM region;
determining a PWM switching frequency as a function of the selected PWM switching frequency style and the determined PWM type; and
transmitting, via the electronic controller to the power inverter, a command signal to regulate a transfer of electrical power between the rechargeable battery and the electric motor based on the PWM switching frequency and the PWM type.

2. The method of claim 1, wherein determining one of the PWM regions includes:
calculating respective high-torque and low-torque thresholds for each of the PWM regions at the speed of the electric motor;
determining, for each of the PWM regions, if the torque of the electric motor lies between the respective high-torque and low-torque thresholds; and
selecting the one of the PWM regions with the respective high-torque and low-torque thresholds between which lies the torque of the electric motor.

3. The method of claim 2, further comprising receiving, via the electronic controller from a speed sensor, a sensor signal indicative of the speed of the electric motor, the speed being a present motor speed of the electric motor.

4. The method of claim 1, further comprising calculating blended torque-speed regions for the determined PWM region layout based on a coolant temperature of the power inverter and/or a current mechanical power state of the electric motor.

5. The method of claim 1, wherein determining the PWM region layout includes selecting the PWM region layout from multiple PWM region layouts including a high-temperature PWM region layout and a low-temperature PWM region layout, and wherein selecting the PWM type includes linearly interpolating between a low coolant temperature associated with the low-temperature PWM region layout and a high coolant temperature associated with the high-temperature PWM region layout.

6. The method of claim 1, wherein the PWM type is selected from a predefined list of PWM types, the predefined list of PWM types including a discontinuous PWM (DPWM) technique, a zero-vector modulation (ZVM) technique, and a continuous PWM (CPWM) technique.

7. The method of claim 1, wherein the PWM switching frequency style is selected from a predefined list of PWM switching frequency styles, the predefined list of PWM switching frequency styles including a constant pulse ratio (cPR) switching style, a constant switching frequency (cFsw) switching style, and a lookup table (LUT) with an array of selectable switching frequencies.

8. The method of claim 7, further comprising, responsive to the PWM switching frequency style being selected from the LUT:
determining if the selected PWM type is a discontinuous PWM (DPWM) technique or a zero-vector modulation (ZVM) technique; and
responsive to the selected PWM type being the DPWM technique or the ZVM technique, retrieving a memory-stored DPWM switching frequency (Fsw) LUT,
wherein the PWM switching frequency is selected from the memory-stored DPWM Fsw LUT.

9. The method of claim 8, further comprising, responsive to the selected PWM type not being the DPWM technique or the ZVM technique, retrieving a memory-stored space-vector PWM (SVPWM) LUT, wherein the PWM switching frequency is selected from the memory-stored SVPWM LUT.

10. The method of claim 1, further comprising:
determining if the selected PWM type is a space-vector PWM (SVPWM) technique and if the determined PWM switching frequency is greater than a threshold maximum PWM switching frequency for SVPWM; and
responsive to the selected PWM type being the SVPWM technique and the determined PWM switching frequency being greater than the threshold maximum PWM switching frequency, setting the PWM switching frequency to the threshold maximum PWM switching frequency for SVPWM prior to transmitting the command signal to the power inverter.

11. The method of claim 1, wherein the speed and the torque of the electric motor include a real-time motor speed and a user-requested motor torque, respectively.

12. The method of claim 1, wherein determining the PWM region layout includes selecting the PWM region layout from multiple distinct PWM region layouts stored in a memory device based on a coolant temperature.

13. The method of claim 12, further comprising receiving, via the electronic controller from a temperature sensor, a sensor signal indicative of the coolant temperature, the coolant temperature being a real-time temperature of a coolant fluid flowing in the power inverter.

14. An electric-drive vehicle comprising:
a vehicle body with multiple road wheels;
a traction motor mounted on the vehicle body and operable to output torque to one or more of the road wheels to thereby propel the electric-drive vehicle;
a traction battery pack mounted on the vehicle body and operable to power the traction motor;
a power inverter module (PIM) electrically connecting the traction battery pack to the traction motor and operable to convert direct current (DC) power output by the traction battery pack to alternative current (AC) power and transfer the AC power to the traction motor; and
a vehicle controller programmed to:
select a pulse width modulation (PWM) region layout with multiple PWM regions arranged in a torque-speed curve calibrated to the traction motor;
select one of the PWM regions in the torque-speed curve based on a speed and a torque of the traction motor;
select a PWM type as a function of the selected PWM region;

select a PWM switching frequency style as a function of the selected PWM region;

select a PWM switching frequency as a function of the selected PWM switching frequency style and the selected PWM type; and transmit a command signal to the PIM to regulate the transfer of electrical power between the traction battery pack and the traction motor based on the PWM switching frequency and the PWM type.

15. The electric-drive vehicle of claim 14, wherein determining one of the PWM regions includes:

calculating respective high-torque and low-torque thresholds for each of the PWM regions at the speed of the electric motor;

determining, for each of the PWM regions, if the torque of the electric motor lies between the respective high-torque and low-torque thresholds; and selecting the one of the PWM regions with the respective high-torque and low-torque thresholds between which lies the torque of the electric motor.

16. The electric-drive vehicle of claim 14, wherein the vehicle controller is further programmed to calculate blended torque-speed regions for the determined PWM region layout based on a coolant temperature of the PIM and/or a current mechanical power state of the electric motor.

17. The electric-drive vehicle of claim 14, wherein the PWM type is selected from a predefined list of PWM types, the predefined list of PWM types including a discontinuous PWM (DPWM) technique, a zero-vector modulation (ZVM) technique, and a continuous PWM (CPWM) technique.

18. The electric-drive vehicle of claim 14, wherein the PWM switching frequency style is selected from a predefined list of PWM frequency styles, the predefined list of PWM switching frequency styles including a constant pulse ratio (cPR) switching style, a constant switching frequency (cFsw) switching style, and a lookup table (LUT) with an array of selectable switching frequencies.

19. The electric-drive vehicle of claim 18, wherein the vehicle controller is further programmed to, responsive to the PWM switching frequency style being selected from the LUT:

determine if the selected PWM type is a discontinuous PWM (DPWM) technique or a zero-vector modulation (ZVM) technique; and responsive to the selected PWM type being the DPWM technique or the ZVM technique, retrieve a memory-stored DPWM LUT, wherein the PWM switching frequency is selected from the memory-stored DPWM LUT.

20. The electric-drive vehicle of claim 14, wherein the vehicle controller is further programmed to:

determine if the selected PWM type is a space-vector PWM (SVPWM) technique and if the determined PWM switching frequency is greater than a threshold maximum PWM switching frequency for SVPWM; and responsive to the selected PWM type being the SVPWM technique and the determined PWM switching frequency being greater than the threshold maximum PWM switching frequency, set the PWM switching frequency to the threshold maximum PWM switching frequency for SVPWM prior to transmitting the command signal to the power inverter.

\* \* \* \* \*